US011793192B2

(12) United States Patent
Kennedy et al.

(10) Patent No.: US 11,793,192 B2
(45) Date of Patent: Oct. 24, 2023

(54) COMPOSITIONS AND METHODS FOR PRESERVATION AND FIXATION

(71) Applicant: Green Solutions Group, LLC, Salisbury, NC (US)

(72) Inventors: Larry Dean Kennedy, Salisbury, NC (US); Danny R. Fields, Stanford, KY (US)

(73) Assignee: Green Solutions Group, LLC, Salisbury, NC (US)

( * ) Notice: Subject to any disclaimer, the term of this patent is extended or adjusted under 35 U.S.C. 154(b) by 0 days.

(21) Appl. No.: 17/829,700

(22) Filed: Jun. 1, 2022

(65) Prior Publication Data

US 2022/0295781 A1 Sep. 22, 2022

Related U.S. Application Data

(63) Continuation of application No. 17/519,088, filed on Nov. 4, 2021, now Pat. No. 11,382,326.

(60) Provisional application No. 63/110,607, filed on Nov. 6, 2020.

(51) Int. Cl.
*G01N 1/00* (2006.01)
*A01N 1/02* (2006.01)
*A01N 1/00* (2006.01)

(52) U.S. Cl.
CPC ............... *A01N 1/021* (2013.01); *A01N 1/00* (2013.01)

(58) Field of Classification Search
None
See application file for complete search history.

(56) References Cited

U.S. PATENT DOCUMENTS 5,679,333 A * 10/1997 Dunphy ............... A01N 1/00
422/5
8,015,677 B2 9/2011 Barrow

OTHER PUBLICATIONS

Nagy, Zoltan Tamas, "A Hands-On Overview of Tissue Preservation Methods for Molecular Genetic Analyses," Org Divers Evol, 2010, 10, pp. 91-105.
Notification of Transmittal of the International Search Report and the Written Opinion of the International Searching Authority, or the Declaration, PCT/US2021/058035, 11 pages.

* cited by examiner

*Primary Examiner* — Jyoti Nagpaul
(74) *Attorney, Agent, or Firm* — Stanek Lemon Crouse & Meeks, PA

(57) ABSTRACT

The present inventive concept provides non-toxic compositions including ethanol, a polymer, and a polar aprotic solvent and methods of using the same in the field of preservation of plant, human and non-human animal tissue and anatomic pathology disciplines (e.g., surgical pathology, histopathology, cytopathology, forensic pathology). In particular, the compositions provide a safer alternative to aldehyde-based compositions.

14 Claims, 2 Drawing Sheets

COMPOSITIONS AND METHODS FOR PRESERVATION AND FIXATION

CROSS-REFERENCE TO RELATED APPLICATIONS

The present application is a continuation of U.S. application Ser. No. 17/519,088, filed Nov. 4, 2021, which claims the benefit of U.S. Provisional Patent Application No. 63/110,607, filed Nov. 6, 2020, the disclosures of which are incorporated herein by reference in their entireties.

COPYRIGHT

This disclosure contains material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

FIELD

The present inventive concept relates to compositions and methods useful in the field of preservation of plant, human (mortuary science and medical education), animal tissue (veterinary science) and anatomic pathology disciplines (e.g., surgical pathology, histopathology, cytopathology, forensic pathology). More particularly, the present inventive concept relates to non-toxic compositions for use in these fields.

BACKGROUND

In general, practitioners of mortuary science have placed significant reliance on solutions containing formaldehyde and other toxic chemicals in high concentration to disinfect and preserve human remains. Medical professionals in the anatomic pathology field have also placed similar reliance on the use of solutions containing formaldehyde in lower concentrations to preserve human tissue for examination. While formaldehyde is a proven tissue preservative that disinfects and preserves human tissue, it is also associated with health risks to users and poses detrimental effects on the environment.

Moreover, the use of formaldehyde in the workplace has become subject to regulation where formaldehyde has been deemed a probable human carcinogen. Governmental regulatory authorities such as the U.S. Department of Labor, Occupational Safety and Health Administration (OSHA), the Environmental Protection Agency (EPA), etc. have placed various limits on workplace formaldehyde vapor exposure.

Workers in mortuary science settings and in medical schools, which include, for example, embalmers, handlers of human cadavers, medical students, and anatomy professors, are constantly exposed to high concentrations of formaldehyde vapors ranging from 25% to near saturation in water of around 40%. Repeated exposure to formaldehyde vapors has been associated with carcinogenesis in laboratory animals (e.g., epitheliomas, nasopharyngeal cancer), and a human pulmonary pathology condition ("embalmer's lung") has been described, owing wholly or in part to environmental formaldehyde vapor exposure. In the pathology field, doctors, nurses, forensic pathologists, coroners, researchers, and interns are exposed to a lower concentration, generally about 4% in water (i.e., formalin).

There is a great need in the mortuary industry and various medical fields for an effective, economical, and non-toxic tissue preservative.

SUMMARY

The present inventive concept provides compositions and methods for safer, effective, and economical alternatives to formaldehyde and other toxic solutions for use as anatomical and/or veterinary science preservatives or embalming fluids.

In particular embodiments, the present inventive concept provides a tissue preservative including ethanol, a polymer, and a polar aprotic solvent. In some embodiments, the tissue preservative is essentially free of an aldehyde. In further embodiments, the tissue preservative is non-toxic and/or environmentally safe. In some embodiments, the non-toxic tissue preservative includes an aqueous solution including ethanol, a humectant, propylene glycol, an acid, a polar aprotic solvent, and a chelating agent. In some embodiments, the compositions may be in the form of a powder, tablet, capsule or gel. In particular embodiments, the composition is in the form of a concentrate. In some embodiments, the compositions may be a pre-injection or co-injection fluid.

According to further embodiments of the present inventive concept, the tissue preservative is a plant, human and/or animal tissue fixative; an anatomical embalming fluid and/or a mortuary embalming fluid.

Further embodiments of the inventive concept provide a method of embalming or preserving a body or anatomical part thereof, including administering to the body or anatomical part thereof a tissue preservative as described herein. The present inventive concept also provides methods of fixing a tissue sample.

Embodiments of the present inventive concept also provide compositions including ethanol, a polymer, and a polar aprotic solvent that function as a non-toxic alternative to formaldehyde for use in multiple industries.

Embodiments of the present inventive concept also provide use of the compositions provided herein for the manufacture of a tissue fixative, an anatomical embalming fluid, a mortuary embalming fluid, a pre-injection fluid, a co-injection fluid and a product for use in multiple industries as a substitute for formaldehyde.

BRIEF DESCRIPTION OF THE DRAWINGS

The figures provided herein are for illustrative purposes only of selected embodiments and do not represent all possible implementations and are not intended to limit the scope of the present disclosure.

DETAILED DESCRIPTION

Figure 1:
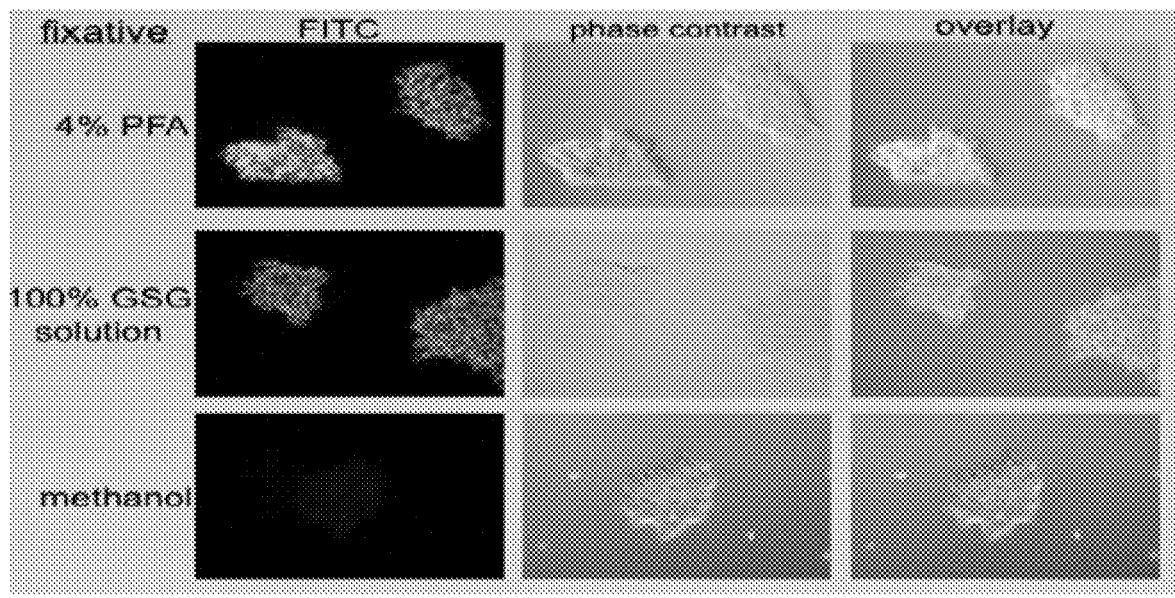
FIG. 1 shows human embryonic stem cell morphology was preserved efficiently using 4% paraformaldehyde, 100% GSG fixative and methanol.

The foregoing and other aspects of the present inventive concept will now be described in more detail with respect to other embodiments described herein. It should be appreciated that the inventive concept can be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention pertains. The terminology used in the description of the invention herein is for the purpose of describing embodiments only and is not intended to be limiting of the invention. As used in the description of the invention and the claims set forth herein, the singular forms "a," "an," and "the" are intended to include the plural forms as well, unless the context clearly indicates otherwise. As used herein, the term "and/or" includes all combinations of one or more of the associated listed items.

All publications, patent applications, patents and other references cited herein are incorporated by reference in their entireties for the teachings relevant to the sentence and/or paragraph in which the reference is presented.

The term "comprising," which is used interchangeably with "including," "containing," or "characterized by," is inclusive or open-ended language and does not exclude additional, unrecited elements or method steps. The phrase "consisting of" excludes any element, step, or ingredient not specified in the claim. The phrase "consisting essentially of" limits the scope of a claim to the specified materials or steps and those that do not materially affect the basic and novel characteristics of the claimed invention. The present disclosure contemplates embodiments of the inventive concept corresponding to the scope of each of these phrases. Thus, various embodiments of the presently disclosed compositions and methods may "comprise," "consist" or "consist essentially of" the components, ingredients or steps disclosed herein.

Embodiments of the present inventive concept provide compositions that serve to disinfect and preserve the body, or parts thereof, in accordance with the desires of those practicing in the mortuary science field. Burials are typically considered "green" if non-toxic, biodegradable materials are used for burial, and if harmful chemicals are not used during embalming. Moreover, the present inventive concept provides a pre-injection/co-injection fluid, an arterial fluid, and body cavity fluid for use in the embalming process. Further, the compositions described herein are optimized for use in the anatomic pathology field to preserve cell/tissue samples.

Particular embodiments of the present inventive concept provide a tissue preservative comprising, consisting essentially of, or consisting of ethanol, a polymer, and a polar aprotic solvent. Ethanol or ethyl alcohol used in the present inventive concept is not substituted with other alcohols such as isopropyl alcohol, glycerol, and methanol. In some embodiments, ethanol in the present inventive concept is described as a grade approved by the FDA that is safe for humans that can have medical applications as an antiseptic and/or disinfectant, a chemical solvent for scientific chemical testing or in synthesis of other organic compounds and can be used across many kinds of manufacturing industries. In some embodiments, the ethanol is 70-proof denatured ethanol. In some embodiments, the ethanol is 200-proof denatured ethanol.

In the present inventive concept, ethanol serves as a solvent, preservative, and and/or a bactericidal agent. Ethanol is considered a universal solvent, as its molecular structure allows for the dissolving of both polar, hydrophilic, and nonpolar, hydrophobic compounds. As a preservative, ethanol begins to denature intracellular proteins by dehydration and coagulation. This is a noted first step in the preservation process, for upon denaturation of intracellular proteins the natural autolytic (decaying) process is arrested. Stabilization of tissues is completed by the action of ethanol. As a bactericide, ethanol kills microorganisms by dissolving their membrane lipid bilayer and denaturing their proteins and is effective against most bacteria, fungi, and viruses.

In some embodiments, the tissue preservative is essentially free of an aldehyde. In other embodiments, the tissue preservative is essentially free of formaldehyde, formalin, formic aldehyde, glutaraldehyde, methanol, methanediol, methanal, methyl aldehyde, methylene glycol and/or methylene oxide.

As used herein, "essentially free" or "substantially free" generally refers to a level considered to be a trace amount or background level. Such levels do not cause material harm that may be associated with the agent. In particular embodiments, essentially free refers to the presence of an aldehyde, formaldehyde, formalin, formic aldehyde, glutaraldehyde, methanol, methanediol, methanal, methyl aldehyde, methylene glycol and/or methylene oxide at a concentration of about 0.001% or less or yet 0%. In particular embodiments of the present inventive concept, compositions described herein do not contain any aldehydes, formaldehyde, formalin, formic aldehyde, glutaraldehyde, methanol, methanediol, methanal, methyl aldehyde, methylene glycol and/or methylene oxide.

Polymers included in the compositions described herein generally include, but are not limited to, homopolymers, copolymers, such as for example, block, graft, random and alternating copolymers, terpolymers, etc., and blends and modifications thereof. Suitable polymers include propylene glycol, diethylene glycol, dipropylene glycol, polyethylene glycol, 1,3-propanediol, ethylene glycol, and combinations thereof. The polymers may have a molecular weight from about 5,000 to about 10,000. In particular embodiments, the polymer is propylene glycol.

Polar aprotic solvents included in the compositions described herein generally include, but are not limited to, isopropyl ethyl acetate, dichloromethane, tetrahydrofuran, ethyl acetate, dimethylformamide, acetonitrile and combinations thereof. In particular embodiments, the polar aprotic solvent is isopropyl ethyl acetate.

According to additional embodiments of the present inventive concept, the tissue preservative may also include a surfactant, a buffer, water, a humectant, an antimicrobial agent, a chelating agent, a fragrance, an emollient and/or a color additive.

Surfactants used in the present inventive concept are generally anionic surfactants. Exemplary anionic surfactants include alkyl ether sulfates, benzyl sulfonates, and phosphate esters. Suitable anionic surfactants for use herein include sodium dodecyl sulfate (SDS), sodium lauryl sulfate (SLS), sodium laureth sulfate (SLES), ammonium lauryl sulfate (ALS), ammonium laureth sulfate (ALES), sodium stearate and potassium cocoate. In particular embodiments, the anionic surfactant is sodium dodecyl sulfate.

As used herein, a buffer is an agent used to maintain the pH of a composition near a chosen value. Buffers are well known to those skilled in the art. In particular embodiments, addition of approximately 4 grams acid sodium phosphate monohydrate and 6.5 grams disodium phosphate (anhydrous) per liter of solution generally is effective as a buffer for the present inventive concept.

As used herein, "water" may refer to potable water, tap water, distilled water, demineralized water, or de-ionized water. In particular embodiments, the compositions are provided as aqueous solutions in water. In some embodiments, the compositions described herein can be present without water or other suitable solvent in the form of a powder, tablet, capsule or gel or with very little water or other suitable solvent in the form of a concentrate to produce a product that can be reconstituted or formulated for use by adding the required amount of water or solvent.

Humectants used in the present inventive concept help to counter effects of dehydration. Suitable humectants include, but are not limited to, glycerine (glycerol), ethylene glycol, propylene glycol, mannitol, and sorbitol. In particular embodiments, the humectant is propylene glycol and/or glycerine.

Antimicrobial agents used in the present inventive concept are used to destroy microorganisms or to prevent their development. The antimicrobial agents include bactericides, germicides, viricides, fungicides, biocides, and sporicidals. In some embodiments, the antimicrobial agent includes aldehydes (0.01% or less, preferably less than 0.001%), halogens, and quaternary ammonium compounds. In particular embodiments, the antimicrobial agent includes ethanol, onyxide 500, hydantoin, phenoxyethanol and mixtures thereof.

Chelating agents or chelants, chelators, or sequestering agents may be included to react with metal ions to form a stable, water-soluble complex to assist with preservation. Suitable chelating agents include, but are not limited to, pyrophosphoric acid, tripolyphosphoric acid, citric acid, tartaric acid, and glycine. In particular embodiments, the chelating agent is EDTA, or a salt thereof.

Fragrances (or perfumes) included in the tissue preservative described herein include fragrances that are non-toxic and can be organic, natural, or synthetic and include essential oils. Eucalyptus, lavender, sandalwood, juniper berries, vanilla, lemon, mint, black currant, amber, peony, black violet, saffron, chrysanthemum, freesia, geranium and rose are non-toxic fragrances suitable for use in the compositions described herein.

An emollient may be used to soften the skin. Suitable emollients include, but are not limited to, castor oil, coconut oil, olive oil, cetyl alcohol, isopropyl myristate, stearic acid, stearyl alcohol, glycerin, propylene glycol, phenoxyethanol, and mineral oil.

A color additive (or coloring agent) included in the tissue preservative described herein includes any non-toxic dye, pigment or substance that imparts color to the tissue preservative. Suitable color additives include, but are not limited to, tetrabromofluorescein (eosin Y), zinc oxide, titanium dioxide, sericite, hematite, goethite, and lepidocrocite.

According to further embodiments of the present inventive concept, the tissue preservative is an aqueous solution. In some embodiments of the present inventive concept, the tissue preservative is in the form of a powder, tablet, capsule or gel. The tissue preservative may also be non-toxic, biodegradable, and/or environmentally safe. According to embodiments of the present inventive concept, none of the components are "dangerous volatile compounds", i.e., the present formulations do not contain any volatile compounds classified as carcinogens, mutagens, and/or teratogens.

Non-toxic refers to minimum risk in normal use. In particular embodiments, the exposure to the substance during the normal course of usage does not result in harmful and/or irreversible side effects to humans and/or the environment. Such side effects to humans may include, but are not limited to, eye, skin, respiratory, reproductive, and nervous system disorders, diseases, etc. Another indicator of non-toxicity is the designation "generally regarded as safe" or GRAS by the United States Food and Drug Administration. These ingredients may not meet usual test criteria for safety but have been extensively used and have not demonstrated any harm to consumers. Moreover, as used herein, the term "non-toxic" is intended to convey a composition that, while effective in preserving tissue as described herein, is safe to use around humans and/or if found in the environment.

"Environmentally safe", "environmentally compatible" "environmentally preferred", "environmentally friendly", or "green", as used herein refer to the quality of not being harmful to plants and/or animals when exposure is under normal conditions or deemed to inflict reduced, minimal, or no harm upon ecosystems and/or the environment.

The term "biodegradable" or "degradable" generally refers to a substance that degrades from the action of naturally occurring microorganisms, such as bacteria, fungi, and algae; environmental heat; moisture; or other environmental factors, such as determined testing methods according to testing standards from guidance organizations such as the Environmental Protection Agency (EPA), Organisation for Economic Co-operation and Development (OECD), American Society for Testing and Materials (ASTM), International Organization for Standardization (ISO), etc.

Embodiments of the present inventive concept also include a non-toxic tissue preservative including an aqueous solution including ethanol, a humectant, propylene glycol, an acid, a polar aprotic solvent, and a chelating agent. Suitable acids include, but are not limited to, ethanoic acid, citric acid, glycolic acid, and pyruvic acid. In particular embodiments, the acid is ethanoic acid.

According to further embodiments of the present inventive concept, the tissue preservative is a plant, human and/or non-human animal tissue fixative. The tissue preservative can be used to preserve plant and animal species in veterinary medicine. Veterinary medicine is the branch of medicine that deals with the prevention, control, diagnosis, and treatment of disease, disorder, and injury in animals. The scope of veterinary medicine is wide, covering all animal species, both domesticated and wild, with a wide range of conditions which can affect different species. In some instances, smaller life forms are immersed in the preservative. In some embodiments, larger animals are injected in the circulatory system and elsewhere with the preservative.

In further embodiments, the tissue preservative is an anatomical embalming fluid suitable for sanitation, sterility, delaying the decay process (e.g., putrefaction) and/or dissection. In still further embodiments, the tissue preservative is a mortuary embalming fluid suitable for sanitation, sterility, delaying the decay process and/or dissection and maintaining cosmetic effects of the body by delaying or counteracting effects such as dehydration, discoloration, distortion, etc. to maintain a more life-like appearance after death.

The present inventive concept further provides methods of embalming a body or anatomical part thereof, including administering into the body or anatomical part thereof the tissue preservative described herein. The method may also include administering the tissue preservative into the circulatory system of the body. The method may also include administering the tissue preservative into the peritoneal and/or thoracic cavity of the body. These steps may be carried out simultaneously or sequentially. The body or anatomical part thereof is a human body or anatomical part thereof, for example, a deceased body or anatomical part thereof for funeral preparation or a cadaver or anatomical part thereof for dissection and/or medical education. In some embodiments, the body or anatomical part thereof is a non-human animal body or anatomical part thereof.

There are different types of cases in the funeral industry such as edema, jaundice, diabetes, Coronavirus disease 2019 (COVID-19) and variants thereof, Human Immunodeficiency Virus, influenza, other infectious diseases, cancer, therapeutic and non-therapeutic/recreational drug use, alcohol use, etc. The formulas of the present inventive concept can be used to preserve bodies or anatomical parts thereof for such cases.

In some embodiments, the anatomical part is a limb, hand, foot, leg, arm, or an isolated organ such as a brain, eye, heart, liver, stomach, intestines, pancreas, muscle, skin, bone, ear, nose, throat, kidney, adrenal gland, gall bladder, pituitary gland, thyroid, testis, thymus, uterus, spinal cord, spleen, bladder, rectum, prostate, breast, cervix, lung, and/or ovary.

The formulations of the present inventive concept successfully preserve human bodies for use in funerals and medical education as required in each segment consistent with the length of time and the quality and condition of the body as required. In the funeral industry, standard embalming is performed to preserve the body to make it suitable (a more "life-like" appearance) for public display at a funeral where the body will be displayed between one (1) to three (3) weeks until burial. In medical education, embalming fluids should provide a good long-term structural preservation of organs and tissues together with a prevention of over-hardening and a retention of color of tissues and organs. They should also prevent desiccation, fungal, or bacterial growth. Reduction of both potential biohazards and environmental chemical hazards is necessary. In anatomical embalming, the embalming process with the present inventive concept can preserve the body for at least a few years (greater than two), although most cadavers dissected in medical schools are used between three (3) to six (6) months, after which the cadaver is incinerated, and the ashes returned to the family of the donor. Accordingly, the formulations of the present inventive concept successfully preserve human bodies or parts thereof for use in funerals and/or medical education and prevent desiccation, fungal, or bacterial growth for a period of time in a range from weeks to years.

The amount of the compositions used is determined on a case-by-case basis as understood by one skilled in the art. Generally, one (1) gallon (or 3.8 L) of the embalming fluid of the present inventive concept is used for every 50 pounds (or 22.7 kg) of body weight.

Embodiments of the present inventive concept also provide methods of fixing a tissue sample. The method includes contacting the tissue sample with the tissue preservative composition described herein for a period time sufficient to fix the tissue sample. Thus, the autolysis and/or putrefaction of the tissue sample is halted to maintain cell and/or tissue morphology typically for further histological analysis. The tissue sample may be from a plant, human and/or animal. The tissue sample may be taken from any part of a human or animal or organ thereof. In some embodiments, the tissue is taken from the brain, eye, heart, liver, stomach, intestines, pancreas, muscle, skin, bone, scalp, ear, nose, throat, kidney, adrenal gland, gall bladder, pituitary gland, thyroid, testis, thymus, uterus, spinal cord, spleen, bladder, rectum, prostate, breast, cervix, lung, and/or ovary. As used herein, tissue also includes cells of the body part and/or ensemble of similar cells and their extracellular matrix.

Overall, embodiments of the present inventive concept include methods of preserving organs, tissues or cells of a subject/organism or part thereof including contacting the organs, tissues, cells, or part thereof with the tissue preservative described herein. In some embodiments, the tissue preservative may be injected intra-arterially into a body, infused into a body and/or applied topically to a body.

Embodiments of the present inventive concept also include a pre-injection fluid. The term "pre-injection" fluid is used herein to denote a formulation that is typically administered into the circulatory system of a human body, as an initial part of the embalming process, prior to the injection of the major tissue preservative. A primary role of the pre-injection fluid is to clear other obstructions and clots from the circulatory system (primarily the vascular system), although the pre-injection fluid can have some tissue preservation and disinfecting properties. This composition can be mixed with and administered at the same time as the major tissue preservative composition and can be referred to a "co-injection" fluid.

Embodiments of the present inventive concept further provide compositions including ethanol, a polymer, and a polar aprotic solvent that function as a non-toxic alternative to formaldehyde for use in multiple industries such as textiles, automotive, consumer products, plastics, adhesives, paints, explosives, film processing/photography, animal feed, composite wood products, etc. Use of the composition described herein provides the benefits derived from using formaldehyde without the detrimental effects to human health or the environment.

Benefits of the compositions and methods of the present inventive concept include, but are not limited to, elimination of being exposed to a human carcinogen, not having a suffocating and/or pungent odor; not causing irritation to the nose and/or throat; not causing nausea and headache; does not cause itching, burning, drying, and/or scaling of skin; is not a serious respiratory irritant; does not cause coughing, wheezing, and/or shortness of breath; does not require the use of an extensive ventilation system (e.g., ventilation hood); eliminates disposal costs of hazardous waste; is easy to store; is easy to dispose; and is safe to transport.

Some aspects of the present inventive concept are described in more detail in the following non-limiting examples.

EXAMPLES

The following examples have been included to provide guidance to one of ordinary skill in the art for practicing representative embodiments of the presently disclosed subject matter. Considering the present disclosure and the general level of skill in the art, those of skill can appreciate that the following examples are intended to be exemplary only and that numerous changes, modifications, and alterations can be employed without departing from the scope of the presently disclosed subject matter. Additionally, constituents of the exemplary compositions described below are present in the amount by weight percent of the total composition with any integers establishing the ranges or contained within the ranges as a percentage of the compositions so long as the total percentage does not exceed 100%.

Example 1: Pre-Injection and/or Co-Injection Fluid

The pre-injection fluid according to this example, is an aqueous solution including ethanol, a humectant (e.g., propylene glycol), a surfactant (e.g., sodium dodecyl sulfate), and a germicidal and biocidal agent (e.g., phenoxyethanol) and an anticoagulant (e.g., sodium citrate). A colorizing agent such as tetrabromofluorescein (eosin Y), and other ingredients commonly employed in embalming fluids, may be included.

The pre-injection fluid desirably has an acidic pH. Preferred compositions have a pH of about 4.

Use of the pre-injection fluid as part of the process of embalming human bodies provides several functions. The pre-injection fluid helps dissolve intravascular clots and fibrin deposits and residues, loosens plaque deposits, and cleanses the vascular system for the subsequent injection of arterial injection (tissue preservative) fluid. Residual fluid remaining in the tissue interstices following evacuation of the pre-injection fluid serves to prevent growth of microorganisms. The flushing action of the pre-injection fluid further helps to remove tissue metabolic wastes, as well as substances such as chemotherapeutic agents, drug metabolites and therapeutic drugs.

When used as a pre-injection fluid (that is, prior to the application of tissue preservation), the fluid is diluted (for example, in water) to 1:5 strength and injected into the vascular system to commence flushing activity. Alternatively, the fluid can be used as a "co-injection" fluid by co-administering it simultaneously with, rather than before, the tissue preservative. Several ounces of the pre-injection solution are added to arterial injection fluid prior to dilution with water for injection. The ratio of co-injection fluid to arterial fluid can vary and can be selected by the embalmer, but it is suggested the ratio is 1:3 prior to the dilution of a pint of the blend to make a gallon of injectable blended fluid.

The following table describes embodiments of an injectable pre-injection fluid designed to flush the human body as part of the embalming process.

TABLE 1

Injectable Pre-Injection Composition

| Ingredient | Composition Range |
| --- | --- |
| Phenoxyethanol | 0.05%-10.00% |
| Propylene Glycol | 2.00%-15.00% |
| EtOH | 18.0%-50.0% |
| Sodium Citrate | 2.00%-12.00% |
| Water | 0.00%-55.0% |
|  | (28.0%-55.0%)* |
| Sodium Dodecyl Sulfate | 0.00%-4.00% |
| EDTA | 0.00%-5.00% |
| Methyl Isobutyl Ketone | 0.00%-2.00% |
| Isopropyl Ethyl Acetate | 0.00%-3.00% |

*exemplary aqueous solution

Example 2: Arterial Injection (Tissue Preservative) Composition

The arterial injection composition of the present inventive concept functions primarily as a tissue preservative, disinfecting and preserving body tissues, including cross-linking proteins, without the use of toxic chemicals. The arterial injection fluid is an aqueous solution composed of alcohol (e.g., ethanol), a humectant (e.g., propylene glycol, glycerine), a polar aprotic solvent (e.g., isopropyl ethyl acetate), an anti-microbial agent, (e.g., onyxide 500, hydantoin), a chelating agent (e.g., a salt of ethylenediaminetetraacetic acid (EDTA), a stable ketone (e.g., methyl isobutyl ketone), a surfactant (e.g., sodium dodecyl sulfate), and a germicidal and biocidal agent (e.g., phenoxyethanol). A colorizing agent such as tetrabromofluorescein (eosin Y), and other ingredients commonly employed in embalming fluids, may be included.

The propylene glycol polymer preferably has an average molecular weight between about 5,000 and 10,000, and most preferably has an average molecular weight of 8,000. Propylene glycol preparations typically contain a distribution of polymer chains of varying lengths and hence molecular weights; thus, referring to an "average" molecular weight is common. Propylene glycol polymers of substantially lower molecular weights (e.g., below 1000) generally are not "rigid" or "solid" enough to provide the desired physical properties, and polymers of substantially higher molecular weights typically are more expensive than, but do not function substantially better than, polymers in the commercially preferred 5,000-10,000 molecular weight range. The arterial injection fluid preferably has a relatively acidic pH, with preferred compositions having a pH of about 4.

The functions of the arterial injection fluid are those of preserving human tissue remains by arresting the natural autolytic process; of preventing or retarding the growth and propagation of microorganisms in situ; and of stabilizing tissue by crosslinking proteins, thereby causing the tissues to harden or "leatherize" as is known in the mortuary science. The present inventive concept sanitizes, preserves, and restores the body to a more natural, life-like appearance.

In further embodiments, the compositions of the inventive concept provide desirable firming of tissue during the embalming process, particularly where tissue has been subject to trauma. It also serves as a suitable drying agent for wet tissue due to wet gangrene and decubitus ulcer. The composition further provides desirable body presentation that offers a natural (i.e., lifelike) appearance before dressing and casketing. A body can be held out for at least up to 21 days after treatment with the compositions of the present inventive concept.

In particular concentration embodiments, the arterial injection fluid can be diluted within a range from 1:1 to 1:5 to disinfect and preserve the body in accordance with the desires of those practicing in the mortuary science field.

The following table describes embodiments of an injectable tissue preservative composition of the present inventive concept designed for injection into the circulatory system of a human body as part of the embalming process.

TABLE 2

Injectable Tissue Preservative Composition

| Ingredient | Composition Range |
| --- | --- |
| EtOH | 45.0%-72.0% |
| Methyl Isobutyl Ketone | 0.02%-0.07% |
| Isopropyl Ethyl Acetate | 0.02%-0.07% |
| Tertiary Butyl Alcohol | 0.02%-0.05% |
| Glycerine | 0.05%-1.20% |
| Propylene Glycol | 10.0%-18.0% |
| Onyxide 500 | 0.01%-0.08% |
| Sodium Dodecyl Sulfate | 0.08%-1.20% |
| Ethylenediamine Tetra-Acetic Acid | 0.03%-0.07% |
| Hydantoin | 0.02%-0.08% |
| Phenoxyethanol | 2.50%-9.40% |
| Water | 0.00%-52.0% |
|  | (30.0%-52.0%)* |

*exemplary aqueous solution

Example 3: Body Cavity Composition

The body cavity fluid of the present inventive concept is an aqueous solution of ethanol, an organic acid, (e.g., ethylenediamine tetraaceticacid (EDTA)), a polar aprotic solvent (e.g., isopropyl ethyl acetate), an antimicrobial agent effective against spore-forming bacteria (e.g., phenoxyethanol, hydantoin). The body cavity fluid functions to disinfect evacuated body cavities and to preserve removed gross organic tissue returned to the body for interment.

During the embalming of human remains, certain body cavities such as the peritoneal and thoracic cavities are evacuated of the natural fluids which fill these spaces. Removal of the cavity fluids is necessary to deny microorganisms a rich media in which to grow. Once evacuated of natural body fluids the cavities must be filled with a suitable fluid to prevent the growth of microorganisms.

Upon death, normally saprophytic bacteria, especially those capable of endospore formation, may migrate out of the gut and into the peritoneal cavity where they begin to digest tissue with adverse effect. Of particular concern to embalmers is the process of purging, where gas liberated from tissue putrification infiltrates tissue membranes causing discoloration of the skin and swelling. The bacteria most usually associated with the formation of ptomaines (putrescine, cadaverine) are those of the genus *Clostridium*. These bacteria possess decarboxylase enzymes which break down amino acids, forming ptomaines and carbon dioxide. The Clostridia bacteria are particularly capable of endospore formation, making them difficult to kill with many bactericidal agents. Thus, the body cavity fluid of the present inventive concept contains sporicidal agents (i.e., antimicrobial agents effective against spore-forming bacteria).

Organs sometimes are removed from the body at autopsy for examination. After the organs are returned for placement into the body at interment, a preservative containing a sporicidal may be used to preserve and disinfect these organs. Returned organs are placed in a suitable sealed plastic bag container which is placed in the chest cavity and the chest is sewn closed tightly. Clearly, the prevention of tissue putrification and gas production is critical in this environment.

Using the described body cavity fluid, disinfection of body cavity spaces is accomplished by the dehydrating action a level of ethanol concentration incompatible with life of vegetative bacteria but not of endospore bacteria, for example, 70-proof or 200-proof denatured ethanol. The fluid contains an ingredient specifically included as a germicide and biocide, phenoxyethanol, which has been demonstrated to kill spore forms of the bacteria, *Clostridium perfringes*, the bacterium most associated with gas production and purging following putrification of tissues. An acid is present in the cavity type fluid to render the pH of the fluid decidedly acidic; *Clostridium perfringes* requires a neutral or slightly alkaline pH media for growth. Compositions of the present inventive concept have a pH of about 2.

Compositions of the body cavity embalming fluid are designed for use undiluted, to be injected directly into evacuated body cavities, or to be poured directly into containers of human gross organs prior to sealing.

The following table describes embodiments of a body cavity fluid for use in the embalming process, according to the present inventive concept.

TABLE 3

Body Cavity Fluid

| Ingredient | Composition Range |
|---|---|
| EtOH | 45.0%-72.0% |
| Methyl Isobutyl Ketone | 0.02%-0.07% |
| Isopropyl Ethyl Acetate | 0.02%-0.07% |

TABLE 3-continued

Body Cavity Fluid

| Ingredient | Composition Range |
|---|---|
| Tertiary Butyl Alcohol | 0.02%-0.05% |
| Glycerine | 0.05%-1.20% |
| Propylene Glycol | 8.00%-15.0% |
| Onyxide 500 | 0.05%-1.90% |
| Sodium Dodecyl Sulfate | 0.08%-1.20% |
| Ethylenediamine Tetra-Acetic Acid | 0.03%-0.07% |
| Hydantoin | 0.02%-0.08% |
| Phenoxyethanol | 4.00%-12.0% |
| Water | 0.00%-48.0% (35.0%-48.0%)* |

*exemplary aqueous solution

Example 4: Tissue Fixation Composition

Another embodiment of the tissue preservative composition of the present inventive concept is provided as a tissue fixative for use in the anatomical pathology field. This tissue fixative is an aqueous solution of ethanol, humectant (e.g., propylene glycol), a long-chain polymer with a molecular weight 5,000 to 10,000, an organic acid (e.g., EDTA), a polar aprotic solvent (e.g., isopropyl ethyl acetate). The solution typically has a relatively acidic pH but may be buffered to a substantially neutral pH (e.g., within the range of about 6.8 to about 7.8). The addition of approximately 4 grams acid sodium phosphate monohydrate and 6.5 grams disodium phosphate (anhydrous) per liter of solution generally is effective to buffer the solution within this pH range.

The purpose of the tissue fixative is to prevent autolysis of tissue removed from the body such that the tissue most closely resembles that as it exists in its natural in situ state. Tissue samples which are taken from the body during surgery, in biopsy or at autopsy are processed and stained for microscopic examination. It is desirable that tissue become fixed or rendered free of autolysis (self-destruction) shortly after collection. In tissue analysis, a fixative must be uniformly effective in penetrating tissue from the outside inward such that all cells are rendered autolytic.

The mode of action of tissue fixation is like that encountered in arterial fluid embalming with a major distinction between the two processes. In embalming, arterial fluid is situated for diffusion into individual cells from interstitial spaces under mild positive pressure. In tissue fixation, the fixative solution enters cells passively through penetration of tissue thicknesses without outside pressure. The latter is a slow process requiring several hours to days to accomplish and is a function of tissue thickness and composition. The process of fixation may be accelerated with the use of microwave energy which heats the tissues.

The following table describes embodiments of a tissue fixative composition of the present inventive concept, designed for use in preserving tissue samples for anatomic pathology.

TABLE 4

Tissue Fixative Composition

| Ingredient | Composition Range |
|---|---|
| EtOH | 40.0%-72.0% |
| Methyl Isobutyl Ketone | 0.02%-0.07% |
| Isopropyl Ethyl Acetate | 0.02%-0.07% |
| Tertiary Butyl Alcohol | 0.02%-0.07% |

TABLE 4-continued

Tissue Fixative Composition

| Ingredient | Composition Range |
| --- | --- |
| Glycerine | 0.05%-1.20% |
| Propylene Glycol | 10.0%-18.0% |
| Onyxide 500 | 0.01%-0.08% |
| Sodium Dodecyl Sulfate | 0.08%-1.20% |
| Ethylenediamine Tetra-Acetic Acid | 0.03%-0.09% |
| Hydantoin | 0.02%-0.08% |
| Phenoxyethanol | 2.00%-9.20% |
| Acid Sodium Phosphate Monohydrate | 0.02%-0.04% |
| Disodium Phosphate (Anhydrous) | 0.02%-0.04% |
| Water | 0.00%-52.0% |
| | (38.0%-52.0%)* |

*exemplary aqueous solution

Human embryonic stem cells that express Green Fluorescent Protein (GFP) were cultured in vitro using standard methods and fixed with 4% paraformaldehyde (PFA), the composition of the present inventive concept (e.g., GSG fixative) at 100%, 50%, 25%, or 10% dilutions, or methanol (MetOH) for 30 minutes at room temperature (or on ice in the case of methanol). The cells were then analyzed using fluorescent microscopy to measure GFP preservation and phase contrast microscopy to assess cell morphology.

Human embryonic stem cell morphology was preserved efficiently using 4% paraformaldehyde, 100% GSG fixative, and methanol. GFP loses its fluorescence when unfolded (denatured), and 4% paraformaldehyde preserves this, however, methanol does not. Consistent with this, a strong fluorescent signal is observed in cells fixed with 4% paraformaldehyde, but not with methanol as shown in FIG. 1.

Figure 2:
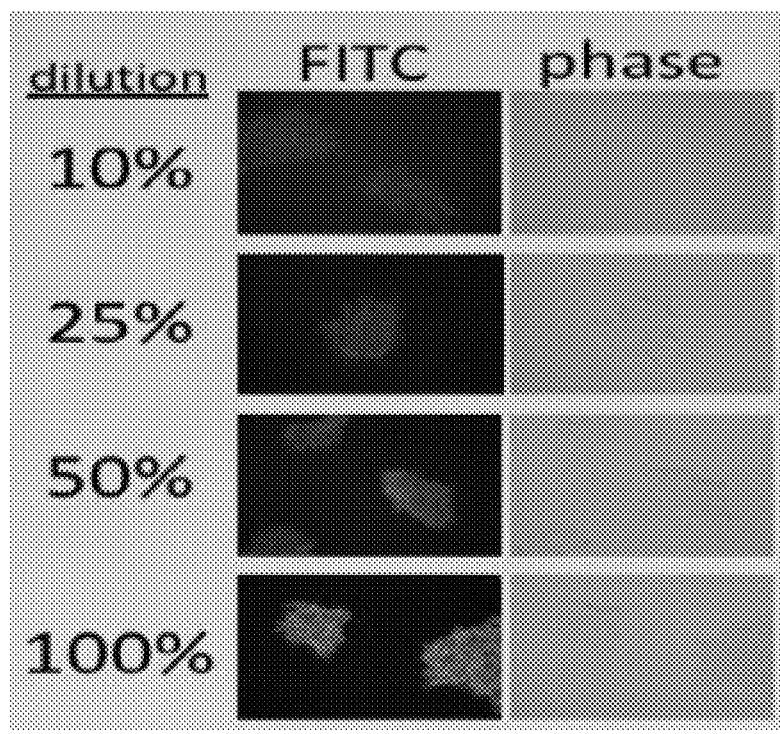
FIG. 2 shows 100% GSG fixative strongly preserves the fluorescent signal, indicating it preserves Green Fluorescent Protein (GFP) folding.

100% GSG fixative also strongly preserves the fluorescent signal, indicating it preserves GFP folding. Dilution of GSG fixative may also yield similar results as those above, and 25%, 50%, and 100% do effectively preserve cell morphology as shown in FIG. 2. Moreover, 25% and 50% GSG fixative preserved the fluorescent signal, however to a lesser degree compared to 100%. A comparison is shown in Table 5 below.

TABLE 5

Comparison of Fixative Solutions

| Fixative | Morphology | Fluorescence |
| --- | --- | --- |
| PFA | ✓✓✓ | ✓✓✓ |
| 10% GSG | X | X |
| 25% GSG | ✓ | ✓ |
| 50% GSG | ✓✓ | ✓✓ |
| 100% GSG | ✓✓✓ | ✓✓✓ |
| MetOH | ✓✓✓ | X |

100% GSG fixative effectively preserves cell morphology and the protein folding of GFP. The significance of maintaining protein folding is this novel fixative will likely be compatible with additional cell biology assays, such as flow cytometry and antibody staining-based assays. Additionally, the use of a non-toxic fixative will reduce costs of transport, handling, training lab personnel, and disposal of the solution.

Although the foregoing subject matter has been described in some detail by way of illustration and example for purposes of clarity of understanding, it will be understood by those skilled in the art (e.g., mortuary science and tissue preservation fields) that certain changes and modifications can be practiced within the scope of the appended claims.

That which is claimed:

1. A pre-injection embalming fluid or co-injection embalming fluid comprising ethanol, a polymer, and a polar aprotic solvent, wherein the pre-injection embalming fluid or co-injection embalming fluid includes about 0.001% or less of an aldehyde.

2. The pre-injection embalming fluid or co-injection embalming fluid of claim 1, wherein the aldehyde is formaldehyde, formalin, formic aldehyde, glutaraldehyde, methanol, methanediol, methanol, methyl aldehyde, methylene glycol and/or methylene oxide.

3. The pre-injection embalming fluid or co-injection embalming fluid of claim 1, wherein the polymer is selected from the group consisting of propylene glycol, diethylene glycol, dipropylene glycol, polyethylene glycol, 1,3-propanediol, ethylene glycol, and combinations thereof.

4. The pre-injection embalming fluid or co-injection embalming fluid of claim 1, wherein the polar aprotic solvent is selected from the group consisting of isopropyl ethyl acetate, dichloromethane, tetrahydrofuran, ethyl acetate, dimethylformamide, acetonitrile and combinations thereof.

5. The pre-injection embalming fluid or co-injection embalming fluid of claim 1, further comprising a humectant, an antimicrobial agent, a chelating agent, a fragrance, an emollient and/or a color additive.

6. The pre-injection embalming fluid or co-injection embalming fluid of claim 1, wherein the pre-injection embalming fluid or co-injection embalming fluid is non-toxic and/or environmentally safe.

7. A method of embalming a body or anatomical part thereof, comprising administering into the body or anatomical part thereof a pre-injection embalming fluid or co-injection embalming fluid of claim 1.

8. The method of claim 7, wherein the method further comprises administering the pre-injection embalming fluid or co-injection embalming fluid of claim 1 into a circulatory system of the body.

9. The method of claim 8, wherein the method further comprises administering into the peritoneal and/or thoracic cavity of the body the pre-injection embalming fluid or co-injection embalming fluid of claim 1.

10. The method of claim 7, wherein the body or anatomical part thereof is a human body or anatomical part thereof.

11. The method of claim 7, wherein the body or anatomical part thereof is a non-human animal body or anatomical part thereof.

12. The pre-injection embalming fluid or co-injection embalming fluid of claim 1, wherein the pre-injection embalming fluid or co-injection embalming fluid is an anatomical embalming fluid.

13. The pre-injection embalming fluid or co-injection embalming fluid of claim 1, wherein the pre-injection embalming fluid or co-injection embalming fluid is a mortuary embalming fluid.

14. The pre-injection embalming fluid or co-injection embalming fluid of claim 1, wherein the pre-injection embalming fluid or co-injection embalming fluid includes 0% aldehyde.

* * * * *

UNITED STATES PATENT AND TRADEMARK OFFICE
CERTIFICATE OF CORRECTION

PATENT NO. : 11,793,192 B2
APPLICATION NO. : 17/829700
DATED : October 24, 2023
INVENTOR(S) : Kennedy et al.

It is certified that error appears in the above-identified patent and that said Letters Patent is hereby corrected as shown below:

In the Claims

Column 14, Claim 2, Line 14: Please correct "methanol, methyl" to read -- methanal, methyl --

Signed and Sealed this
Ninth Day of January, 2024

Katherine Kelly Vidal
*Director of the United States Patent and Trademark Office*